United States Patent
Kim et al.

(10) Patent No.: US 10,915,989 B2
(45) Date of Patent: Feb. 9, 2021

(54) APPARATUS AND METHOD OF PROCESSING IMAGE DATA USING IFFT

(71) Applicants: SAMSUNG ELECTRONICS CO., LTD., Suwon-si (KR); University of Seoul Industry Cooperation Foundation, Seoul (KR)

(72) Inventors: Hojung Kim, Suwon-si (KR); Kichul Kim, Seoul (KR); Yongkyu Kim, Suwon-si (KR); Hongseok Lee, Suwon-si (KR)

(73) Assignees: SAMSUNG ELECTRONICS CO., LTD., Suwon-si (KR); University of Seoul Industry Cooperation Foundation, Seoul (KR)

( * ) Notice: Subject to any disclaimer, the term of this patent is extended or adjusted under 35 U.S.C. 154(b) by 253 days.

(21) Appl. No.: 16/032,830

(22) Filed: Jul. 11, 2018

(65) Prior Publication Data

US 2019/0266704 A1    Aug. 29, 2019

(30) Foreign Application Priority Data

Feb. 23, 2018    (KR) .................. 10-2018-0022236

(51) Int. Cl.
| | |
|---|---|
| *G06K 9/36* | (2006.01) |
| *G06T 3/40* | (2006.01) |
| *G06T 7/11* | (2017.01) |
| *G06T 5/10* | (2006.01) |

(52) U.S. Cl.
CPC ............. *G06T 3/4084* (2013.01); *G06T 5/10* (2013.01); *G06T 7/11* (2017.01); *G06T 2207/20056* (2013.01)

(58) Field of Classification Search
CPC . G06T 3/4084; G06T 5/10; G06T 7/11; G06T 2207/20056; G03H 1/0808
USPC .................................................. 382/232-253
See application file for complete search history.

(56) References Cited

U.S. PATENT DOCUMENTS

| | | |
|---|---|---|
| 8,890,931 B2 | 11/2014 | Tsang et al. |
| 10,088,802 B2 | 10/2018 | Kim et al. |
| 2002/0156822 A1 | 10/2002 | Tanai |
| 2009/0219380 A1* | 9/2009 | Cable .................. G03H 1/0808 348/40 |
| 2015/0097993 A1* | 4/2015 | Oniki ....................... G06T 5/50 348/241 |
| 2017/0064333 A1 | 3/2017 | Kim et al. |

FOREIGN PATENT DOCUMENTS

| | | |
|---|---|---|
| KR | 10-1366116 B1 | 2/2014 |
| KR | 10-1421984 B1 | 7/2014 |
| KR | 10-2017-0016158 A | 2/2017 |

* cited by examiner

*Primary Examiner* — Andrew M Moyer
(74) *Attorney, Agent, or Firm* — Sughrue Mion, PLLC

(57) ABSTRACT

A method and apparatus for processing image data are provided. An image data processing apparatus includes: a receiver configured to receive image data that represents a current frame; and a processor configured to perform an inverse fast Fourier Transform (IFFT) computation with respect to a first region of the current frame, and to obtain an IFFT computation result with respect to a second region of the current frame by using a result of the IFFT computation with respect to the first region.

17 Claims, 6 Drawing Sheets

APPARATUS AND METHOD OF PROCESSING IMAGE DATA USING IFFT

CROSS-REFERENCE TO RELATED APPLICATION

This application claims priority from Korean Patent Application No. 10-2018-0022236, filed on Feb. 23, 2018, in the Korean Intellectual Property Office, the disclosure of which is incorporated herein by reference in its entirety.

BACKGROUND

1. Field

Example embodiments relate to methods of processing image data and apparatuses for processing image data.

2. Description of the Related Art

In recent years, studies have been conducted on three-dimensional (3D) image-related technology. In addition, devices for implementing high-quality holograms in real time by using a complex spatial light modulator (SLM) that is capable of controlling the amplitude and phase of light at the same time have been actively studied.

Computer-generated holograms (CGH) have recently been used to reproduce holographic moving images. In this regard, image data processing apparatuses are used to calculate hologram values for respective positions on a hologram plane. Image data processing apparatuses according to some technologies are required to perform a complicated operation, such as a Fourier Transform, in order to express a point in a space.

An image data processing apparatus, such as a television (TV), a mobile device, etc., may process image data to reproduce holographic images. In this case, the image data processing apparatus may perform a Fourier transform on image data and reproduce an image based on transformed data.

Image data processing is time consuming due to quite a large amount of computations. In particular, as portable devices such as mobile devices have limited size and available power, there is a need for methods of reducing the amount of computations and correspondingly reducing the required time for performing image data processing.

SUMMARY

Provided are methods and apparatuses for effectively and efficiently processing image data.

Additional aspects will be set forth in part in the description which follows and, in part, will be apparent from the description, or may be learned by practice of the presented example embodiments.

According to an aspect of an example embodiment, an image data processing apparatus includes: a receiver configured to receive image data that represents a current frame; and a processor configured to perform an inverse fast Fourier Transform (IFFT) with respect to a first region of the current frame, and to obtain an IFFT computation result with respect to a second region of the current frame by using a result of the IFFT computation with respect to the first region.

The image data may include red, green, and blue (RGB) data of the current frame.

The location of the first region may be symmetrical to the location of the second region with respect to the center of the current frame.

The processor may perform a first one-dimensional (1D) IFFT with respect to the first region in a horizontal direction, and may perform a second 1D IFFT respect to the first region in a vertical direction.

The processor may perform the second 1D IFFT with respect to columns that correspond to the first region from among whole columns of the current frame in the vertical direction.

The processor may obtain the IFFT computation result with respect to the second region by using a symmetrical characteristic that relates to a symmetry between the first region and the second region.

The first region may be located on an upper left side of the current frame, and the second region may be located on a lower right side of the current frame.

The processor may be further configured to perform an IFFT computation with respect to a third region of the current frame; and to obtain an IFFT computation result with respect to a fourth region of the current frame by using a result of the IFFT computation with respect to the third region.

The third region may be located on a lower left side of the current frame, and the fourth region may be located on an upper right side of the current frame.

The image data processing apparatus may further include a memory configured to store the result of the IFFT computation with respect to the first region.

According to an aspect of an example embodiment, a method of processing image data includes: receiving the image data that represents a current frame; performing an IFFT computation with respect to a first region of the current frame; and obtaining an IFFT computation result with respect to a second region of the current frame by using a result of the IFFT computation with respect to the first region.

The image data may include RGB data of the current frame.

The location of the first region may be symmetrical to the location of the second region with respect to the center of the current frame.

The performing of the IFFT computation may include performing a first 1D IFFT with respect to the first region in a horizontal direction and performing a second 1D IFFT with respect to the first region in a vertical direction.

The performing of the second 1D IFFT in the vertical direction may include performing the second 1D IFFT in the vertical direction with respect to columns that correspond to the first region from among whole columns of the current frame.

The obtaining of the IFFT computation result with respect to the second region may include obtaining the IFFT computation result with respect to the second region by using a symmetrical characteristic that relates to a symmetry between the first region and the second region.

The first region may be located on an upper left side of the current frame, and the second region may be located on a lower right side of the current frame.

The method may further include performing the IFFT computation with respect to a third region of the current frame, and obtaining the IFFT computation result with respect to a fourth region of the current frame by using the result of the IFFT computation with respect to the third region.

The third region may be located on a lower left side of the current frame, and the fourth region may be located on an upper right side of the current frame.

According to an aspect of an example embodiment, a computer program stored in a recording medium to implement the methods described above may be provided.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Example embodiments will now be described in detail with reference to the accompanying drawings. The descriptions of the example embodiments are only for realizing the technical content of the embodiment and should not be interpreted as limiting the scope of right, and additional embodiments that are readily inferred from the detailed descriptions and example embodiments by those of ordinary skill in the art will be construed as being included in the present disclosure.

It will be further understood that the term "comprises" or "includes" should not be construed as necessarily including various constituent elements and various operations described in the specification, and also should not be construed that portions of the constituent elements or operations of the various constituent elements and various operations may not be included or additional constituent elements and operations may further be included.

The terminologies including ordinals, for example, first, second, etc. as used in the specification are used for the purpose of describing various constituent elements, but the constituent elements should not be limited by the terminologies. These terms are only used to distinguish one element from another. In addition, terminologies including ordinals, unless otherwise defined, may be interpreted as referring to another constituent element in another drawing, but are not limited thereto.

The present example embodiments relate to rendering methods and apparatuses, and detailed descriptions of information widely known to one of ordinary skill in the art to which the example embodiments described below pertain are omitted.

Hereinafter, example embodiments will be described in detail with reference to the accompanying drawings.

Figure 1:
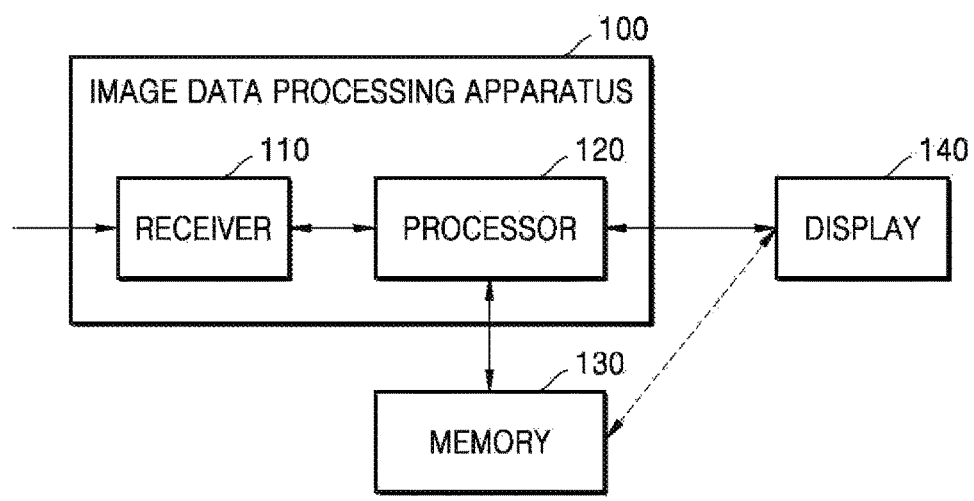
FIG. 1 is a block diagram of an image data processing apparatus, according to an example embodiment.

FIG. 1 is a block diagram of an image data processing apparatus 100, according to an example embodiment. It will be understood by persons having ordinary skill in the art that the image data processing apparatus 100 may further include other general constituent elements besides the constituent elements depicted in FIG. 1. Further, according to another example embodiment, it will be understood by those of ordinary skill in the art that some of the constituent elements depicted in FIG. 1 may be omitted.

Referring to FIG. 1, the image data processing apparatus 100 according to an example embodiment may include a receiver 110, a processor 120, and/or other suitable components. Further, the image data processing apparatus 100 according to another example embodiment may further include a memory 130 and/or a display 140.

The receiver 110 according to the present example embodiment may obtain image data from the outside of the image data processing apparatus 100. For example, the receiver 110 may receive image data that represents a current frame. As an example, the receiver 110 may receive red, green and blue (RGB) data with respect to the current frame. The receiver 110 may receive RGB data of colors to be displayed by each of the pixels that constitute the current frame. When the receiver 110 receives image data that represents the current frame, the data received by the receiver 110 may be data that constitutes real numbers. Further, the receiver 110 may receive data of a plurality of frames to display an image. The image to be displayed may include a two-dimensional (2D) image or a three-dimensional (3D) image (for example, a hologram image), but the image is not limited thereto. In addition, the frame is not limited to a specific shape. For example, the frame may have a rectangular shape or a circular shape, but the shape of the frame is not limited thereto.

The display 140 according to the present example embodiment may display an image based on the control of the processor 120. The display 140 may display an image by receiving data from the processor 120. Further, the display 140 may display an image by using data directly received from the memory 130 based on the control of the processor 120. The displayed image may be a 2D image or a 3D image. In addition, the display 140 may include a medium for displaying a hologram. For example, the display 140 may include a panel.

The processor 120 according to the present example embodiment may perform a layer-based algorithm. The processor 120 may perform calculations by splitting a reproduction region of the hologram based on depth. The processor 120 may perform any of a Fourier Transform (FT), a Fast Fourier Transform (FFT), an Inverse Fourier Transform (IFT), or an Inverse Fast Fourier Transform (IFFT) with respect to each of divided layers. For example, the processor 120 may obtain data that represents one pixel of a hologram image by performing an FFT at least twice. The FFT described below may include a Fourier Transform.

A coordinate according to an example embodiment may vary based on a reference. Accordingly, coordinate values that correspond to the same pixel may vary based on the reference. For example, when a coordinate value of a hologram that corresponds to a location of the display 140 is a first coordinate value (u, v), a coordinate value of a hologram that corresponds to a location of a pupil is a second coordinate (m, n), and a coordinate value of a hologram that corresponds to a location of retina is a third coordinate value (x2, y2), the first coordinate value (u, v), the second coordinate value (m, n), and the third coordinate value (x2, y2) that all correspond to the same pixel may be different from each other.

The processor 120 according to the present example embodiment may use a focus term to process an image data. The focus term according to the present example embodiment may be used for focusing in relation to a hologram image. The processor 120 may perform a first FT, which is a FFT with respect to a section from the display 140 to the pupil. Further, the processor 120 may perform a second FT which is a FFT with respect to a section from the pupil to the retina. The processor 120 may use a value obtained by multiplying a result of the first FT by the focus term as an input to the second FT. The focus term according to the present example embodiment may be obtained from a look-up table. For example, the processor 120 may load the focus term that corresponds to the second coordinate value (m, n) from a look-up table stored in the memory 130, but the present example embodiment is not limited thereto.

The receiver 110 according to the present example embodiment may receive image data. The image data received by the receiver 110 may include depth information and color information of an object. For example, the image data may include depth information and color information of each pixel of the object to be displayed.

The image data may represent a 3D image. The image data that represents the 3D image may include depth data. For example, the image data may include pixel data that corresponds to each depth from among a plurality of depths.

A 3D image according to the present example embodiment may include a hologram image. For example, the 3D image may be recorded in a recording medium as an interference pattern by using an interference phenomenon between an object wave that is reflected by an object when light emitted from a laser is directly irradiated onto the object and a reference wave reflected by a reflector.

Hereinafter, a case in which an IFFT or a FT is performed may not be redundantly described. An example embodiment in which an IFFT is performed is substantially an inverse of the case in which the FFT is performed, and thus, for the sake of the simplicity of the entire specification, only one of either of these cases will be described. Accordingly, although only one of the IFFT and the FFT is described, it shall be understood by persons having ordinary skill in the art that an embodiment in which another type of FT is performed will be interpreted as being included in the scope of the present disclosure.

The processor 120 according to the present example embodiment may perform a 1D IFFT on image data received by the receiver 110 one or more times based on a first distance.

The first distance may be a predetermined distance, i.e., a distance that is set in advance. For example, the first distance may correspond to a distance between a pupil and a retina.

The processor 120 according to the present example embodiment may perform a first 1D IFFT in a first direction and may perform a second 1D IFFT in a second direction on image data received by the receiver 110 based on the first distance. For example, the processor 120 may perform the first 1D IFFT in a horizontal direction (a row direction) and may perform the second 1D IFFT in a vertical direction (a column direction). As another example, the processor 120 may reverse the order by performing the 1D IFFT in the vertical direction and performing the 1D IFFT in the horizontal direction.

The processor 120 according to the present example embodiment may perform the 1D IFFT in the first direction and may perform the 1D IFFT in the second direction based on a second distance (for example, a distance from the display to the pupil) on result data upon which a 2D IFFT has been performed based on the first distance. For example, the processor 120 may perform the 1D IFFT in the horizontal direction (a row direction), and may perform the 1D IFFT in the vertical direction (a column direction). As another example, the processor 120 may perform the 1D IFFT in the vertical direction and may perform the 1D IFFT in the horizontal direction.

The processor 120 according to the present example embodiment may transform the image data received by the receiver 110 in order to display the received image data. As an example, the processor 120 may perform a representation operation in which the format of the received image data is converted so that the received data is used for a display of a 3D image. For example, the image data processing apparatus 100 may perform a normalization operation on the received image data. In detail, the processor 120 according to the present example embodiment may perform a representation that transforms (normalizes) the received image data.

The processor 120 according to the present example embodiment may perform an IFT computation with respect to a first region of a current frame.

The IFT computation may include a 2D IFT computation. Hereinafter, a case of performing the 2D IFT computation will be described. The IFT may include an IFFT.

The processor 120 may perform an IFT with respect to a first region included in the current frame. The processor 120 may perform the 2D IFT computation by performing a first 1D IFT with respect to a first region included in the current frame in a horizontal direction, and afterwards, performing a second 1D IFT with respect to the first region included in the current frame in a vertical direction.

A region where the 1D IFT in the horizontal direction is performed and a region where the 1D IFT in the vertical direction is performed may be different from each other based on the location and shape of the first region. For example, in the case when the first region has a rectangular shape and is located on a upper left side of the current frame, the processor 120 may perform the first 1D IFT with respect to a range that includes the first region in the horizontal direction, and may perform the second 1D IFT with respect to a range that includes the first region in the vertical direction.

Further, if there are multiple regions where the IFT computation is performed, the processor 120 may perform the 2D IFT computation with respect to a range that includes the multiple regions. As an example, regions where the IFT computation is performed may include a first region and a third region, and when the first region is a region that has a rectangular shape and is located on a upper left side of the current frame and the third region is a region that has a rectangular shape and is located on a lower left side of the current frame, the processor 120 may perform the first 1D IFT with respect to a range that includes the first region and the third region in the horizontal direction, and may perform the second 1D IFT with respect to a range that includes the first region and the third region in the vertical direction. In this case, the 1D IFT in the vertical direction may be omitted with respect to a region that does not include the first region and the third region. For example, when the processor 120 performs the 1D IFT in the vertical direction, the processor 120 may perform the 1D IFT with respect to columns that correspond to the first region from among total columns of the current frame in the vertical direction.

The processor 120 according to the present example embodiment may obtain an IFT computation result with respect to a second region that corresponds to the first region by using an IFT computation result with respect to the first region.

The second region according to the present example embodiment may correspond to the first region. For example, the first region and the second region may be symmetrical to each other based on a location. As an example, the location of the first region may be symmetrical to the location of the second region with respect to the center of the current frame. If the first region is located on an upper left side of the current frame, the second region may be located on a lower right side of the current frame.

Further, if there are multiple regions where the IFT computation is performed, each region may be symmetrical to another region. For example, if the third region is located on a lower left side of the current frame, a fourth region that corresponds to the third region may be located on a lower right side of the current frame.

The processor 120 according to the present example embodiment may obtain an IFT computation result with respect to the second region by using an IFT computation result with respect to the first region. In order for the processor 120 to obtain the IFT computation result with respect to the second region from the IFT computation result with respect to the first region without performing an IFT computation with respect to the second region, content described below may be used. In detail, hereinafter, a theoretical example of performing an IFFT by the image data processing apparatus 100 according to the present example embodiment will be described. Although only a method of performing an IFFT is described in order to simplify the entire description, it will be easily understood by one of ordinary skill in the art that the image data processing apparatus 100 may also perform a FFT in a reverse manner with respect to that described for an IFFT.

A relationship of Equation 1 holds with respect to a variable $x_n$, that is, $x_N \in \mathbb{R}$.

$$X(u,v) = \mathcal{F}^{-1}[\mathcal{F}^{-1}[x(m,n):m]:n] \qquad \text{[Equation 1]}$$

At this point, a relationship of Equation 2 holds by an even/odd symmetry.

$$\mathfrak{R}[X(u,v)] = \mathfrak{R}[X(M-u,v)], \mathfrak{I}[X(u,v)] = -\mathfrak{I}[X(M-u,v)]$$

$$\mathfrak{R}[X(u,v)] = \mathfrak{R}[X(u,N-v)], \mathfrak{I}[X(u,v)] = -\mathfrak{I}[X(u,N-v)] \qquad \text{[Equation 2]}$$

Accordingly, a relationship of Equation 3 holds.

$$X(M-u,N-v) = X(u,v)^* \qquad \text{[Equation 3]}$$

When a property of Equation 3 is applied to data of N/2-point extracted from a superposition IFFT algorithm, all data with respect to a 2D IFFT computation may be calculated.

In this aspect, based on certain characteristics (for example, symmetry between corresponding regions), the processor 120 may obtain an IFT computation result with respect to the second region from an IFT computation result with respect to the first region without performing a separate IFT computation with respect to the second region. For example, the processor 120 may obtain an IFT computation result with respect to the second region by using a symmetrical characteristic between an IFT computation result with respect to the first region and an IFT computation result with respect to the second region without performing a separate IFT computation with respect to the second region.

In order to obtain an IFT computation result with respect to the second region from an IFT computation result with respect to the first region without performing an IFT computation with respect to the second region, input image data may be real number data. For example, the processor 120 may receive RGB data which is real number data from the receiver 110, and with respect to the received RGB data, may obtain an IFT computation result with respect to the second region from an IFT computation result with respect to the first region without performing a separate IFT computation with respect to the second region.

The processor 120 according to the present example embodiment may perform the 2D IFFT twice. For example, the processor 120 may perform the 1D IFFT in a first horizontal direction (i.e., a row direction) based on a first distance (for example, a distance from a pupil to a retina), the 1D IFFT in a first vertical direction (i.e., a column direction) based on the first distance, the 1D IFFT in a second vertical direction (i.e., a column direction) based on a second distance (for example, a distance from the pupil to a display), and an IFFT in a second horizontal direction (i.e., a row direction) based on the second distance. Further, in performing the 2D IFFT twice, the processor 120 may obtain an IFT computation result with respect to the second region by using symmetrical characteristics between an IFT computation result with respect to the first region and an IFT computation result with respect to the second region without performing a separate IFT computation with respect to the second region. However, the present example embodiment is not limited thereto. For example, with respect to an order of operations, in addition to the order of the first horizontal direction, the first vertical direction, the second vertical direction, and the second horizontal direction, which are described above, an order of the first horizontal direction, the first vertical direction, the second horizontal direction, and the second vertical direction, an order of the first vertical direction, the first horizontal direction, the second vertical direction, and the second horizontal direction, and an order of the first vertical direction, the first horizontal direction, the second horizontal direction, and the second vertical direction may also be possible.

The processor 120 according to the present example embodiment may reduce a number of computations and/or an overall computational amount when input data (for example, an RGB data) of a real number type is processed. For example, when the processor 120 performs the 1D IFFT in the first horizontal direction (i.e., a row direction) and the 1D IFFT in the first vertical direction (i.e., a column direction), the number of computations may be reduced by obtaining an IFT computation result with respect to the second region without performing an IFT computation with respect to the second region. However, when the processor 120 performs the 1D IFFT in the second horizontal direction (i.e., a row direction) and the 1D IFFT in the second vertical direction (i.e., a column direction), the processor 120 may obtain an IFT computation result with respect to the second region by performing an IFT computation with respect to the second region.

The memory 130 according to the present example embodiment may temporarily, semi-permanently, or permanently store various data. For example, the memory 130 may store IFT/FT computation results with respect to the first region and/or the third region.

The memory 130 may be interpreted in a broad range to include an arbitrary electronic component that is able to store electronic information. The memory 130 according to the present example embodiment may refer to any of various types of processor-readable media, such as arbitrary (random) access memories (RAMs), read-only memories (ROMs), non-volatile arbitrary (random) access memories (NVRAMs), programmable read-only memories (PROMs), erasable PROMs (EPROMs), electrically erasable PROMs (EEPROMs), flash memories, magnetic or optical data storage devices, registers, and/or any other suitable type of memory. If the processor 120 reads information from the memory 130 or may write information in the memory 130, it is to be understood that the memory 130 is in an electronically communicating state with the processor 120. The memory 130 integrated in the processor 120 is in an electronically communicating state with the processor 120.

The display 140 according to the present example embodiment may display an object based on the control of the processor 120. An image displayed by the display 140 may be a 3D image. For example, the display 140 may display a hologram image which is a 3D image of an object.

Figure 2:
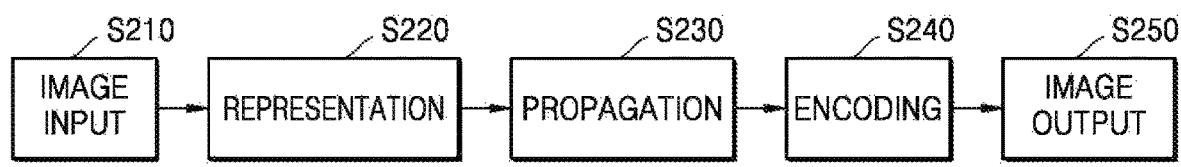
FIG. 2 is a flowchart of a method of processing image data that is implemented by an image data processing apparatus, according to an example embodiment.

FIG. 2 is a flowchart showing a method of processing image data that is implemented by an image data processing apparatus 100, according to an example embodiment. Referring to FIG. 2, the image data processing apparatus 100 may receive image data and may output an image that corresponds to the received image data.

The method of FIG. 2 may be an example embodiment in which image data is processed according to a layer-based algorithm, but the present example embodiment is not limited thereto.

The image data processing apparatus 100 may generate a hologram image. An image data may be recorded in a recording medium based on a holographic technique used for generating a hologram according to the present example embodiment, that is, the image data may be recorded in the recording medium in an interference pattern form by using an interference phenomenon between an object wave that is reflected by an object when light emitted from a laser is directly irradiated onto the object and a reference wave reflected by a reflection mirror. A resultant product produced via execution of the holographic technique may be referred to as a hologram. When an image stored in a hologram is restored, reference light that has the same wavelength and phase as those of light when the image is recorded may be again irradiated to the recording medium. A hologram may be artificially generated. For example, computer-generated holography (CGH) is a technique for readily generating a hologram using a general computer by modeling an optical apparatus of the related art and mathematically modeling optical variables. Further, CGH may be used for generating a digital hologram that includes the same 3D image data in real time. In order to generate a hologram by using CGH, a significant amount of data should be computed in real time, so high-speed processing of data may be important.

In order to view a layer-based holographic display as an image, a significant amount of data should be computed in real time, and thus, high speed processing of the data may be important.

The image data processing apparatus 100 may perform various types of algorithms for calculating the digital hologram in real time and generating the digital hologram at a high speed. For example, mathematical models for computing CGH include a point cloud algorithm, a polygon algorithm, a layer-based algorithm, etc. The point cloud algorithm is a method of representing a 3D image as a spatial set of points and consists of points, and thus is suitable for representing an object with various surfaces. The polygon algorithm is a representation of surfaces of a 3D image as polygons. Since the polygon algorithm uses a FFT, the polygon algorithm needs a relatively small number of computations as compared with the point cloud algorithm. The layer-based algorithm is a method of dividing and calculating a reproduction region of a hologram by a depth reference and may generate a hologram by performing a FFT or an IFFT on each divided layer.

Referring to FIG. 2, a propagation operation in which input image data that includes depth information and color information is converted and corrected to be fit to the layer-based hologram and FFT computations are performed twice for each depth may be performed. Afterwards, in order to display the image, complex data may be converted into integer values via encoding.

With respect to the overall algorithm of FIG. 2, operation S230 may occupy more than 80% of all computations, and thus, power consumption for performing operation S230 may be the greatest. Further, in operation S230, an FFT computation between a screen and a pupil, a focusing term computation to express the image in the pupil, and a FFT computation between the pupil and the retina may be performed.

Hereinafter, each operation will be described in detail.

In operation S210, the image data processing apparatus 100 receives image data. For example, if the layer-based algorithm is applied to the image data in a CGH computation, the image data may include color data (or a color image), depth data (or a depth image), and/or any other suitable type of image data. The color data may be data that indicates a plurality of colors for each layer. For example, the color data may include at least one of red data, blue data, and green data. The layer-based algorithm is a method of processing data of each split plane by splitting a reproduction region of a hologram based on depth. The image data processing apparatus 100 may perform an FT or an IFT with respect to data of each split plane in a process of generating and/or displaying a hologram image.

In operation S220, the image data processing apparatus 100 may perform a representation operation that includes transforming a form of the image data received in operation S210 in order to perform propagation in operation S230. For example, the image data processing apparatus 100 may perform a normalization operation on the data received in operation S210. As an example, the image data processing apparatus 100 may match green data with one value from among 0~255 received in operation S210 to one value from among 0~1.

Further, the image data processing apparatus 100 may perform an image quality compensation and a field computation in operation S220. The image data processing apparatus 100 may compensate image data in order to increase the image quality of the image data.

In operation S230, the image data processing apparatus 100 may perform a propagation operation that includes a performance of an FT, an FFT, an IFT, and/or an IFFT.

For example, the image data processing apparatus 100 may perform an FT on image data in the form of a 2D matrix. The image data processing apparatus 100 may perform a 1D FT twice in order to effectuate a 2D FT. The image data processing apparatus 100 may perform the 1D FT on image data in a horizontal direction (i.e., a row direction) and may perform the 1D FT on the transformed image data in a vertical direction (i.e., a column direction). The image data processing apparatus 100 may generate a hologram image via the FT.

As another example, the image data processing apparatus 100 may use a focus term in a process of performing an FT or an IFT a plurality of times. As an example, the image data processing apparatus 100 may perform a first FFT, and afterwards, may use a result obtained by multiplying a result of the first FFT by the focus term as an input of a second FFT. As another example, the image data processing apparatus 100 may perform a first IFFT, and afterwards, may use a result obtained by multiplying a result of the first IFFT by the focus term as an input of a second IFFT.

In operation S240, the image data processing apparatus 100 may perform encoding. For example, the image data processing apparatus 100 may generate data to be input to a screen via pixel encoding.

In operation S250, the image data processing apparatus 100 outputs an image via a display. The display may broadly refer to any apparatus for displaying an image.

Figure 3:
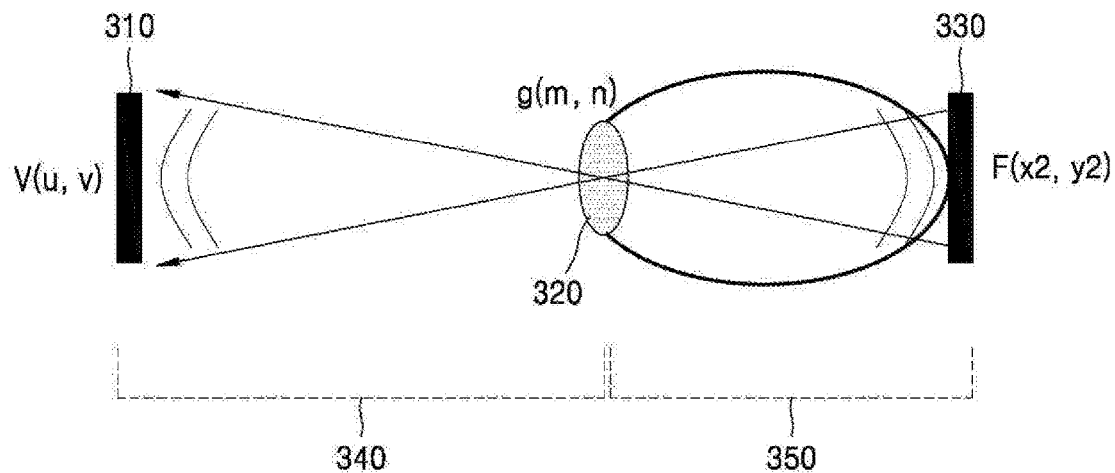
FIG. 3 illustrates a method of performing a computation with respect to image data that is implemented by an image data processing apparatus, according to an example embodiment.

FIG. 3 illustrates a method of performing a computation on image data that is implemented by the image data processing apparatus 100, according to an example embodiment. In detail, a computation of the image data that corresponds to a process of recognizing an image displaying on a display 310 by a retina 330 via a pupil 320 will be described.

The image data processing apparatus 100 according to the present example embodiment may perform the FT or IFT a plurality of times in a process of processing a hologram image.

For example, the image data processing apparatus 100 according to the present example embodiment may perform a first FT which is a FT with respect to a first distance 350, that is, a section from the pupil 320 to the retina 330. Alternatively, the image data processing apparatus 100 may perform a first IFT which is an IFT with respect to the first distance 350.

As another example, the image data processing apparatus 100 may perform a second FT which is a FT with respect to a second distance 340, that is, a section from the display 310 to the pupil 320. Alternatively, the image data processing apparatus 100 may perform a second IFT which is an IFT with respect to the second distance 340.

The image data processing apparatus 100 according to the present example embodiment may use a focusing term in a process of performing the FT or IFT a plurality of times.

For example, a value obtained via the first FT and a computation result of the focusing term may be used for an input of the second FT. As an example, the image data processing apparatus 100 may perform the second FT by applying a value obtained by multiplying the value obtained via the first FT by the focusing term as an input to the second FT. In addition, a pixel value to be used for a hologram image may be determined by using data obtained via the second FT.

A coordinate value according to the present example embodiment may vary based on a reference. Accordingly, coordinate values that correspond to the same pixel may have values which are different from each other based on the reference. For example, when a coordinate value of a hologram image that corresponds to a location of the display 310 is a first coordinate value (u, v), a coordinate value of a hologram image that corresponds to a location of the pupil 320 is a second coordinate value (m, n), and a coordinate value of a hologram image that corresponds to a location of the retina 330 is a third coordinate value (x2, y2), values of the first coordinate (u, v), the second coordinate (m, n), and the third coordinate (x2, y2) that all correspond to the same pixel may be different from one another.

Figure 4:
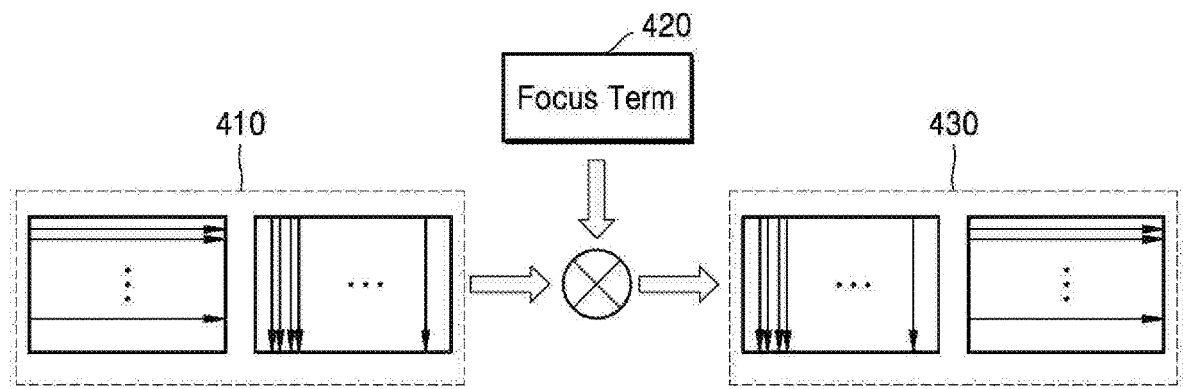
FIG. 4 illustrates a method of processing image data by performing a Fourier Transform or an inverse Fourier Transform multiple times that is implemented by an image data processing apparatus, according to an example embodiment.

FIG. 4 illustrates a method of processing image data by performing an FT a plurality of times or an IFT a plurality of times that is implemented by the image data processing apparatus 100, according to an example embodiment.

An FT or an IFT may be performed in a horizontal direction or a vertical direction. Referring to FIG. 4, during a process of processing image data, the image data processing apparatus 100 may perform a 1D FFT or a 1D IFFT twice on the image data. For example, the image data processing apparatus 100 may generate first data by performing a 1D FFT 410 on the image data in each of a horizontal direction and a vertical direction. Further, the image data processing apparatus 100 may generate second data by performing a 1D FFT 430 on a value obtained by multiplying the first data by a focus term 420 in each of the horizontal direction and the vertical direction.

As another example, the image data processing apparatus 100 may generate third data by performing the 1D FFT 410 on the image data in each of the horizontal direction and the vertical direction. Further, the image data processing apparatus 100 may generate fourth data by performing the 1D FFT 430 on a value obtained by multiplying the third data by the focus term 420 in each of the horizontal direction and the vertical direction.

Figure 5:
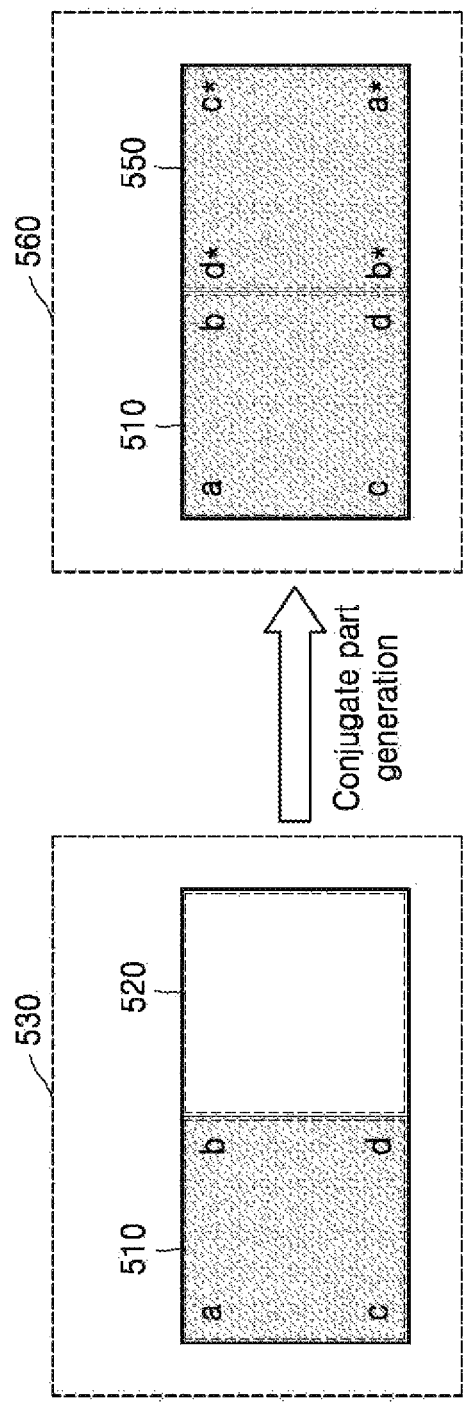
FIG. 5 illustrates an example of obtaining a second result value by using a first result value by the image data processing apparatus, according to an example embodiment.

FIG. 5 illustrates an example of obtaining a second result value by using a first result value by the image data processing apparatus 100, according to an example embodiment.

When properties of Equations 1, 2, and 3 are applied to data of N/2-point that is extracted from a super-position IFFT computation, all data with respect to a 2D IFFT computation may be obtained.

The image data processing apparatus 100 may obtain first result data 530 by performing a 1D IFT or a 2D IFT. Since the 1D or the 2D IFT is performed with respect to only a first region, an IFT computation result 520 with respect to a second region may not be included in the first result data 530. However, the image data processing apparatus 100 may obtain second result data 560 that includes an IFT computation result 550 with respect to the second region from the first result data 530. In detail, based on the characteristics (for example, the symmetry) described above, the image data processing apparatus 100 may obtain the IFT computation result 550 with respect to the second region from an IFT computation result 510 with respect to the first region without performing an IFT computation with respect to the second region. For example, the processor 120 may obtain the IFT computation result 550 with respect to the second region by using the symmetrical characteristic between the IFT computation result 510 with respect to the first region and the IFT computation result 550 with respect to the second region without performing a separate IFT computation with respect to the second region.

If the image data processing apparatus 100 according to the present example embodiment receives image data of a current frame that has a size of 1K*2K, the image data processing apparatus 100 may obtain the IFT computation result 510 that has a size of 1K*1K with respect to the first region, and may obtain the IFT computation result 550 that has a size of 1K*1K with respect to the second region from the IFT computation result 510 with respect to the first region by using the symmetrical characteristic described in Equation 3 without performing an IFT with respect to the second region.

Figure 6:
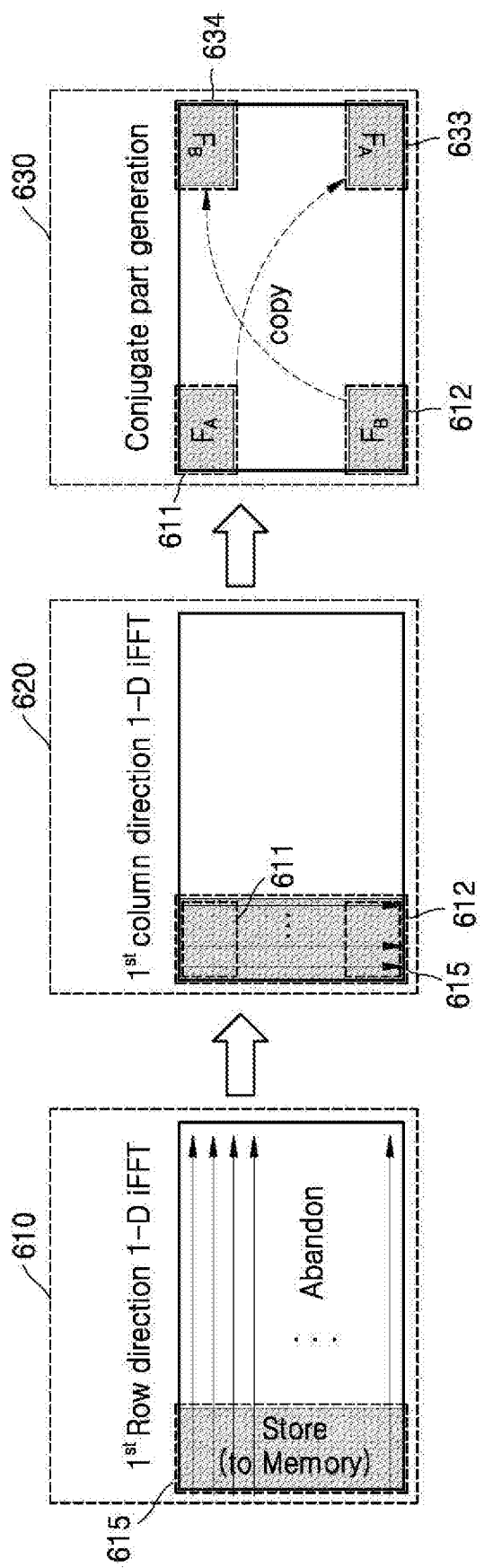
FIG. 6 illustrates an example of processing image data of a current frame by using some result values by the image data processing apparatus, according to an example embodiment.

FIG. 6 illustrates an example of processing image data of a current frame by using some result values by the image data processing apparatus 100, according to an example embodiment.

The image data processing apparatus 100 according to the present example embodiment may perform the first 2D IFT as depicted in FIG. 6 via a performance of a CGH computation by using the method described above.

In detail, when the 1D IFFT in the first horizontal direction (i.e., the row direction) is performed, only a portion of the current frame on the left side is stored in a memory, and a conjugate part on the right side is not stored by applying a frequency filtering operation. Afterwards, when the 1D IFFT in the first vertical direction (i.e., the column direction) is performed, certain portions on upper/lower sides of the current frame are stored by applying a frequency filtering operation, and afterwards, when a second 2D IFFT is performed, as depicted in FIG. 6, data stored in the conjugate part may be read. Accordingly, a result value with respect to the conjugate part in the right side of the current frame may be substantially obtained without performing a computation, and thus, a number of computations is reduced.

In a case 610 that the 1D IFFT in the first horizontal direction (i.e., the row direction) is performed, although the image data processing apparatus 100 according to the present example embodiment performs the 1D IFFT with respect to the whole region in the horizontal direction (i.e., the row direction), only a value with respect to a region that includes a first region 611 and a third region 612 may be stored. For example, the image data processing apparatus 100 may store only a computation result with respect to a left region 615 in a memory.

In a case 620 that the 1D IFFT in the first vertical direction (i.e., the column direction) is performed, the image data processing apparatus 100 according to the present example embodiment may perform the 1D IFFT with respect to the region 615 that includes the first region 611 and the third region 612 in the vertical direction (i.e., the column direction), and a result value with respect to the left region 615 that includes the first region 611 and the third region 612 may be stored. In detail, the image data processing apparatus 100 may perform the 1D IFT with respect to the columns that correspond to the first region 611 from among all columns of a current frame in the vertical direction. For example, the image data processing apparatus 100 may store only a computation result with respect to the first region 611 and the third region 612 of the left region 615 in a memory.

The image data processing apparatus 100 according to the present example embodiment may obtain result data with respect to a second region 633 by using the computation result with respect to the first region 611, and may obtain result data with respect to a fourth region 634 by using the computation result with respect to the third region 612.

The result data with respect to the second region 633 and the fourth region 634 may be obtained by using the result data with respect to the first region 611 and the third region 612 without actually performing an IFFT, and thus, an amount of computation by the image data processing apparatus 100 may be reduced.

The image data processing apparatus 100 according to the present example embodiment may omit a computation or may not store a computation result with respect to a region that is difficult to be recognized by human eyes. For example, the image data processing apparatus 100 may obtain the computation results with respect to the first, second, third, and fourth regions 611, 612, 633, and 634 and store them in a memory. In this case, with respect to regions other than the first, second, third, and fourth regions 611, 612, 633, and 634, the computation may be omitted or the computation results may not be stored in the memory.

Figure 7:
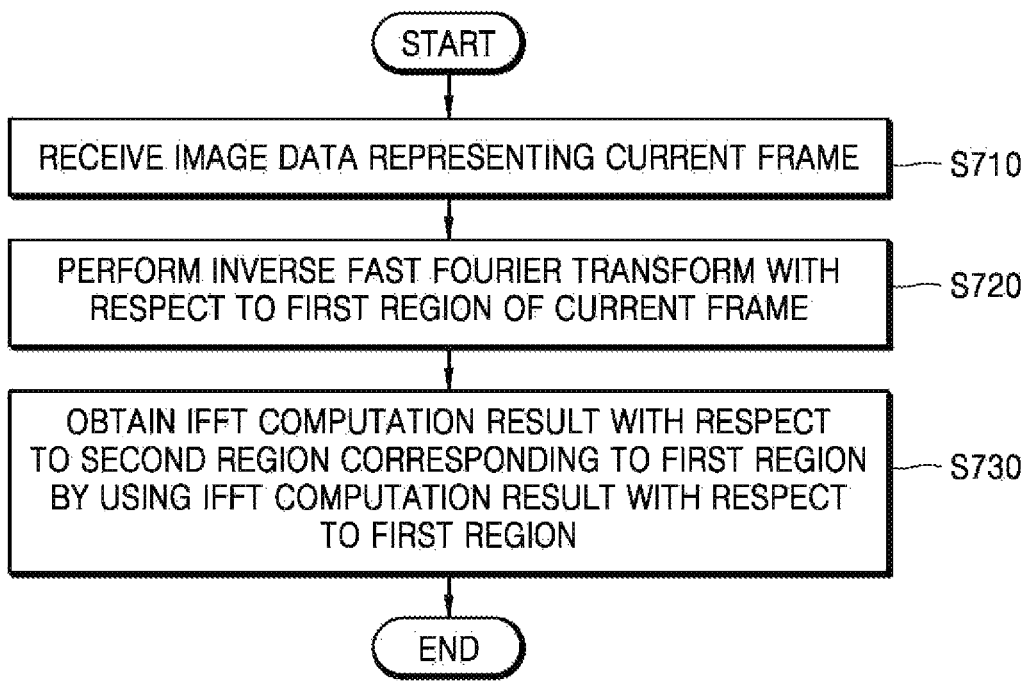
FIG. 7 is a flowchart of a method of obtaining computation results with respect to a first region and a second region of a current frame.

FIG. 7 is a flowchart for explaining a method of obtaining computation results with respect to a first region and a second region that is implemented by the image data processing apparatus 100, according to the present example embodiment.

In operation S710, the image data processing apparatus 100 according to the present example embodiment receives image data that represents a current frame.

For example, the image data processing apparatus 100 may receive image data that represents a current frame. As an example, the image data processing apparatus 100 may receive RGB data with respect to the current frame. The image data processing apparatus 100 may receive RGB data of colors to be displayed by each of the pixels that constitute the current frame. When the image data processing apparatus 100 receives image data that represents the current frame, the data received by the image data processing apparatus 100 may be data that includes real numbers. Further, the image data processing apparatus 100 may receive data of a plurality of frames to display an image. The image to be displayed may include a 2D image or a 3D image (for example, a hologram image), but the image is not limited thereto. Still further, the frame (for example, the current frame) is not limited to a specific shape. For example, the frame may have a rectangular shape or a circular shape, but the shape of the frame is not limited thereto.

In operation S720, the image data processing apparatus 100 performs an IFT with respect to the first region of the current frame.

The IFT may include a 2D IFT computation. As an example, hereinafter, a case of performing the 2D IFT computation will be described.

The image data processing apparatus 100 may perform an IFT with respect to the first region included in the current frame. The image data processing apparatus 100 may perform a first 1D IFT with respect to the first region included in the current frame in a horizontal direction, and afterwards, may perform the 2D IFT computation by performing a second 1D IFT in a vertical direction.

A region in which the 1D IFT in the horizontal direction or a region in which the 1D IFT in the vertical direction may be different from each other based on the location and shape of the first region. For example, when the first region has a rectangular shape and is located on a upper left side of the current frame, the image data processing apparatus 100 may perform the first 1D IFT with respect to a range that includes the first region in the horizontal direction, and may perform the second 1D IFT with respect to a range that includes the first region in the vertical direction.

Further, if there are multiple regions where the IFT computation is performed, the image data processing apparatus 100 may perform the 2D IFT computation with respect to a range that includes the multiple regions. As an example, if the multiple regions where the IFT is performed include a first region and a third region, the first region has a rectangular shape and is located on a upper left side of a current frame, and the third region has a rectangular shape and is located on a lower left side of the current frame, the image data processing apparatus 100 may perform the first 1D IFT with respect to a range that includes the first region and the third region in the horizontal direction, and may perform the second 1D IFT with respect to the range that includes the first region and the third region in the vertical direction. In this case, the IFT with respect to a region that excludes the first region and the third region in the vertical direction may be omitted. For example, when the image data processing apparatus 100 performs the second 1D IFT in the vertical direction, the image data processing apparatus 100 may perform the 1D IFT in the vertical direction with respect to columns that correspond to the first region from among whole columns of the current frame.

In operation S730, the image data processing apparatus 100 according to the present example embodiment obtains an IFT computation result with respect to a second region of the current frame that corresponds to the first region by using an IFT computation result with respect to the first region.

The second region according to the present example embodiment may correspond to the first region. For example, the first region and the second region may be symmetrical to each other based on a predetermined location. As an example, the location of the first region may be symmetrical to the location of the second region with respect to the center of the current frame. If the first region is located on an upper left side of the current frame, the second region may be located on a lower right side of the current frame.

Further, when regions for performing the IFTs include a plurality of regions, respective regions that correspond to each of the regions may symmetrical to each other. For example, if a third region is located on a lower left side of a current frame, a fourth region that corresponds to the third region may be located on a lower right side of the current frame.

The image data processing apparatus 100 according to the present example embodiment may obtain an IFT computation result with respect to the second region by using an IFT computation result with respect to the first region. In order for the image data processing apparatus 100 to obtain an IFT computation result with respect to the second region from the IFT computation result with respect to the first region without performing an IFT computation with respect to the second region, the following content may be used.

In this aspect, based on the characteristics (for example, symmetry according to Equation 3) described above, the image data processing apparatus 100 may obtain an IFT computation result with respect to the second region from the IFT computation result with respect to the first region without performing an IFT computation with respect to the second region. For example, the image data processing apparatus 100 may obtain the IFT computation result with respect to the second region by using the symmetrical characteristic between the IFT computation result with respect to the first region and the IFT computation result with respect to the second region without performing a separate IFT computation with respect to the second region.

Figure 8:
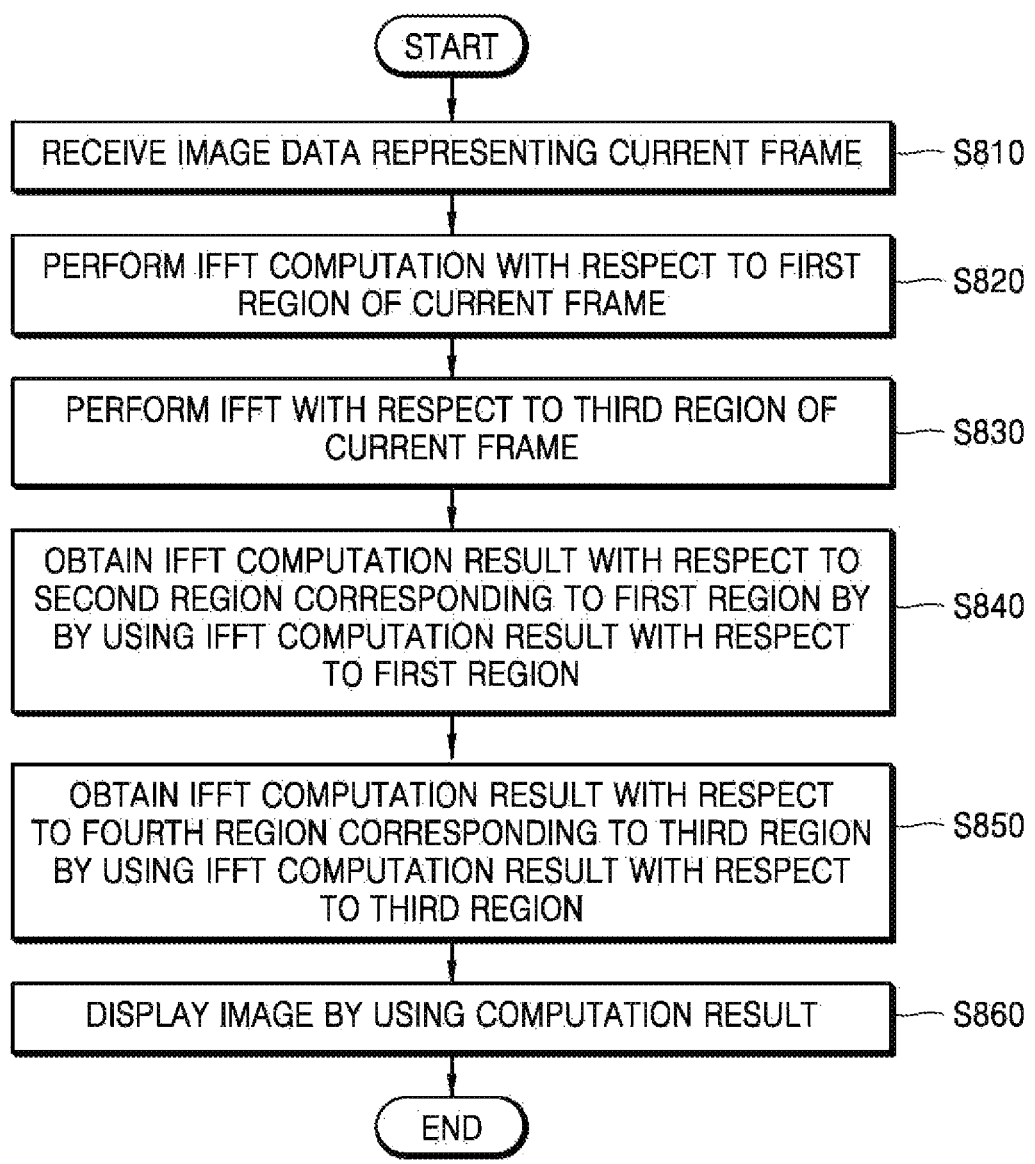
FIG. 8 is a flowchart of a method of obtaining computation results with respect to first, second, third, and fourth regions of a current frame.

FIG. 8 is a flowchart for explaining a method of obtaining computation results with respect to first, second, third, and fourth regions by the image data processing apparatus 100.

In operation S810, the image data processing apparatus 100 according to the present example embodiment receives image data that represents a current frame. Current operation may refer to operation S710, and since the current operation corresponds to operation S710, the detailed description thereof will be omitted for the simplicity of whole explanation.

In operation S820, the image data processing apparatus 100 according to the present example embodiment performs an IFT computation with respect to the first region of the current frame. The current operation may refer to the operation S720, and since the current operation corresponds to operation S720, the detailed description thereof will be omitted for the simplicity of whole explanation.

In operation S830, the image data processing apparatus 100 performs an IFT computation with respect to the third region of the current frame. The image data processing apparatus 100 according to the present example embodiment may perform an IFT computation similarly as with respect to the third region as the IFT computation performed with respect to the first region. For the detailed description in relation with the current operation, the description of S820 may be referred to.

In operation S840, the image data processing apparatus 100 according to the present example embodiment obtains an IFT computation result with respect to the second region that corresponds to the first region by using the IFT computation result with respect to the first region. The current operation may refer to the description of S730, and since the current operation corresponds to operation S730, the detailed description thereof will be omitted for the simplicity of whole explanation.

In operation S850, the image data processing apparatus 100 according to the present example embodiment obtains an IFT computation result with respect to the fourth region that corresponds to the third region by using the IFT computation result with respect to the third region. The image data processing apparatus 100 may obtain an IFT computation result with respect to a fourth region without performing an IFT computation similarly as described above with respect to obtaining the IFT computation result with respect to the second region without performing an IFT computation. For the detailed description in relation with the current operation, the description of S840 may be referred to.

In operation S860, the image data processing apparatus 100 according to the present example embodiment displays a 3D image by using a processing result of the image data performed in operations S840 and/or S850. The 3D image may include a hologram image.

The image data processing apparatus 100 according to the present example embodiment may include a processor, a memory for storing and executing program data, a permanent storage such as a disk drive, a communication port for performing communication with an external device, and a user interface, such as a touch panel, a key, and a button. Methods implemented with a software module or an algorithm may be stored in a transitory or non-transitory computer readable recording medium in the form of computer readable codes or program instructions executable in the processor. Examples of the non-transitory computer readable recording medium include magnetic storage media (e.g., read-only memory (ROM), random-access memory (RAM), floppy disks, hard disks, etc.) and optical recording media (e.g., CD-ROMs, Digital Versatile Discs (DVDs), etc.). The computer readable recording medium can also be distributed over network coupled computer systems so that the computer readable code is stored and executed in a distributed fashion. The media can be read by a computer, stored in the memory, and executed by the processor.

In accordance with one or more example embodiments, an image processing operation for displaying a 3D image may be effectively performed with a reduced time.

Specific executions described in the present disclosure are example embodiments and do not limit the technical scope of the present inventive concept even in any method. For conciseness of the specification, disclosure of conventional electronic configurations, control systems, software, and other functional aspects of the systems may be omitted. In addition, connections or connection members of lines between components shown in the drawings illustrate functional connections and/or physical or circuit connections, and the connections or connection members can be represented by replaceable or additional various functional connections, physical connections, or circuit connections in an actual apparatus.

What is claimed is:

1. An image data processing apparatus comprising:
 a receiver configured to receive image data that represents a current frame, wherein the current frame is divided into a first region, a second region, a third region, and a fourth region; and
 a processor configured to:
  perform an inverse fast Fourier Transform (IFFT) computation with respect to the first region and the third region, of the current frame,
  obtain an IFFT computation result with respect to the second region of the current frame, without performing an IFFT computation with respect to the second region, by using a result of the IFFT computation with respect to the first region, and
  obtain an IFFT computation result with respect to the fourth region by using a result of the IFFT computation with respect to the third region, without performing an IFFT computation with respect to the fourth region,
 wherein the first region and the second region are disposed to be symmetrical with respect to a center of the current frame in a first diagonal direction of the current frame, and
 the third region and the fourth region are disposed to be symmetrical with respect to the center of the current frame in a second diagonal direction of the current frame that intersects the first diagonal direction in the center.

2. The image data processing apparatus of claim 1, wherein the image data comprises red, green, and blue data of the current frame.

3. The image data processing apparatus of claim 1, wherein the processor is further configured to perform a first one-dimensional (1D) IFFT with respect to the first region in a horizontal direction, and to perform a second 1D IFFT with respect to the first region in a vertical direction.

4. The image data processing apparatus of claim 3, wherein the processor is further configured to perform the second 1D IFFT with respect to columns that correspond to the first region from among all columns of the current frame in the vertical direction.

5. The image data processing apparatus of claim 3, wherein the processor is further configured to obtain the IFFT computation result with respect to the second region by using a symmetrical characteristic that relates to a symmetry between a location of the first region and a location of the second region with respect to the center of the current frame.

6. The image data processing apparatus of claim 1, wherein the first region is located on an upper left side of the current frame,
 the second region is located on a lower right side of the current frame, and
 the processor is further configured to obtain the IFFT computation result with respect to the second region based on a symmetry between a location of the first region and a location of the second region.

7. The image data processing apparatus of claim 6, wherein the third region is located on a lower left side of the current frame,
 the fourth region is located on an upper right side of the current frame, and
 the processor is further configured to obtain the IFFT computation result with respect to the fourth region based on a symmetry between a location of the third region and a location of the fourth region.

8. The image data processing apparatus of claim 1, further comprising a memory configured to store the result of the IFFT computation with respect to the first region.

9. The image data processing apparatus of claim 1, wherein the processor is further configured to control to display a three-dimensional image generated based on the IFFT computation result with respect to the second region and the IFFT computation result with respect to the fourth region.

10. A method of processing image data, the method comprising:
 receiving image data that represents a current frame, wherein the current frame is divided into a first region, a second region, a third region, and a fourth region;
 performing an inverse fast Fourier Transform (IFFT) computation with respect to the first region and the third region, of the current frame;
 obtaining an IFFT computation result with respect to the second region of the current frame, without performing an IFFT computation with respect to the second region, by using a result of the performing the IFFT computation with respect to the first region; and
 obtain an IFFT computation result with respect to the fourth region by using a result of the IFFT computation with respect to the third region, without performing an IFFT computation with respect to the fourth region,
 wherein the first region and the second region are disposed to be symmetrical with respect to a center of the current frame in a first diagonal direction of the current frame, and
 the third region and the fourth region are disposed to be symmetrical with respect to the center of the current frame in a second diagonal direction of the current frame that intersects the first diagonal direction in the center.

11. The method of claim 10, wherein the image data comprises red, green, and blue data of the current frame.

12. The method of claim 10, wherein the performing the IFFT computation with respect to the first region further comprises:
 performing a first one-dimensional (1D) IFFT with respect to the first region in a horizontal direction; and
 performing a second 1D IFFT with respect to the first region in a vertical direction.

13. The method of claim 12, wherein the performing the second 1D IFFT in the vertical direction further comprises:
 performing the second 1D IFFT with respect to columns that correspond to the first region from among all columns of the current frame in the vertical direction.

14. The method of claim 10, wherein the obtaining the IFFT computation result with respect to the second region further comprises:
 obtaining the IFFT computation result with respect to the second region by using a symmetrical characteristic that relates to a symmetry between a location of the first region and a location of the second region with respect to the center of the current frame.

15. The method of claim 14, wherein the third region is located on a lower left side of the current frame, the fourth region is located on an upper right side of the current frame, and the obtaining the IFFT computation result with respect to the fourth region further comprises obtaining the IFFT computation result with respect to the fourth region based on a symmetry between a location of the third region and a location of the fourth region.

16. The method of claim 10, wherein the first region is located on an upper left side of the current frame, the second region is located on a lower right side of the current frame, and the obtaining the IFFT computation result with respect to the second region further comprises obtaining the IFFT computation result with respect to the second region based on a symmetry between a location of the first region and a location of the second region.

17. A non-transitory computer-readable recording medium having recorded thereon a program that, when executed by a computer, causes the computer to perform the method of claim 10.

\* \* \* \* \*